United States Patent [19]

Jayan et al.

[11] Patent Number: 5,782,940
[45] Date of Patent: Jul. 21, 1998

[54] PROCESS FOR THE PREPARATION OF ALUMINA ABRASIVES

[75] Inventors: Ponnarassery Sukumaran Jayan, Cochin; Narayanan Ananthaseshan, Ernakulam; Balachandran Subramaniam, Kochi; Murugappan Vellayan Murugappan, Chennai, all of India

[73] Assignee: Carborundum Universal Limited, Madras, India

[21] Appl. No.: 805,984

[22] Filed: Feb. 25, 1997

[30] Foreign Application Priority Data

Mar. 15, 1996 [IN] India ............................. 409/MAS/96

[51] Int. Cl.$^6$ ............................................. C09C 1/68
[52] U.S. Cl. ................................. 51/309; 501/153
[58] Field of Search .................... 51/293, 309; 501/153

[56] References Cited

U.S. PATENT DOCUMENTS

| | | | |
|---|---|---|---|
| 4,404,003 | 9/1983 | Harris | 51/293 |
| 4,829,031 | 5/1989 | Roy et al. | 501/153 |
| 5,302,564 | 4/1994 | Winkler et al. | 51/309 |
| 5,542,961 | 8/1996 | Swei et al. | 51/295 |

*Primary Examiner*—Deborah Jones
*Attorney, Agent, or Firm*—Gunn & Associates

[57] ABSTRACT

The present disclosure is directed to a method of converting the preferred hydrated alumina oxide, boehmite, into a green particle which is then sintered to form an abrasive alumina particle. The process involves dispersing boehmite in water at a slightly elevated temperature with an acidic pH, then seeding it with alumina seed particles and drying it, then crushing to desired shapes and sizes, calcining the dried precipitate and sintering the calcined. This forms a high quality alumina abrasive grains. The apparatus used for sintering incorporates an elongate hollow tube, an insulative sleeve thereabout to define an elevated temperature zone, and a microwave generator coupled through a wave guide into a microwave cavity incorporated in the tube. The particles are moved through the tube at a controlled rate to assure adequate exposure to the microwave radiation.

12 Claims, 4 Drawing Sheets

PROCESS FOR THE PREPARATION OF ALUMINA ABRASIVES

BACKGROUND OF THE DISCLOSURE

Microwave heating has demonstrated itself to be a powerful technique for sintering various ceramics, especially through the past decade. Microwave heating may decrease the sintering temperatures and times dramatically, and is economically advantageous due to considerable energy savings. However, one of the major limitations is the volume and/or size of the ceramic products that can be microwave sintered, because of an inhomogenous microwave energy distribution inside the applicator which often results in a non-uniform heating. Considerable research has gone into making microwave sintering technology viable, but batch processing was always a handicap.

Continuous microwave sintering of alumina is a newly developed process. The principle of the continuous microwave sintering furnace is shown in FIG. 1. The microwave applicator is designed to focus the microwave field in the central area as uniformly as possible. A long cylindrical ceramic hollow tube contains the green alumina which is fed into the microwave applicator at a constant feed speed. As the alumina enters the microwave cavity, it is heated and gradually sintered while passing through the microwave zone. The heating rate, sintering time and cooling rate are controlled by the input microwave power, the feeding speed, and the thermal insulation surrounding the heated alumina. The ceramic hollow tube is also rotated during processing for uniform and homogenous heating. As the green alumina passed through the high temperature zone, the particles are sintered entirely. Since the ceramic hollow tube is moved relatively continuously in the axial direction during the processing, there is virtually no limitation to the length of the product that can be processed by this technique. Consequently, it is possible to scale-up the volume of the ceramic products to be microwave sintered by this technique to provide a continuous process.

This disclosure proves the continuous microwave sintering technique for large quantities of commercial alumina grains with properties required for use as an advanced abrasive grain.

The disclosure also is directed to a novel synthesis method for the manufacture of alumina based sol gel abrasive utilizing the newly developed microwave processing. The process offers a faster, energy efficient route to manufacture abrasive alumina grains. Grains prepared by this method exhibited micro hardness above 2200 kg/mm$^2$ 98% theoretical density, crystalline uniformity and average size less than 0.5 microns with high abrasion properties.

One aspect of this invention relates to improved preparation of alumina abrasives. The alumina particles are used for both coated and bonded abrasives. They are conventionally produced using arc furnace melting technology with either calcined bauxite or calcined alumina as the starting material and at temperatures above 2000° C.

These conventionally prepared alumina abrasives normally have grain sizes above 150 microns. The conventional process for the production of alumina abrasive grains is through fusion using the known arc furnace. The calcined alumina is melted at temperatures above 2000° C. or calcined bauxite is fused at temperatures above 2000° C. in presence of carbon to reduce its impurities such as titania, iron oxide, silica etc.

In both the above cases, the molten material is cooled, crushed, magnetically screened and graded to obtain the various grit sizes required for abrasive grain preparation. Since the process requires melting of the raw material, the process becomes highly energy intensive; worse, the crystal size of the resulting abrasive grain is more than 150 microns in size.

Subsequently, another process was developed through sol gel route yielding abrasive grains with small crystal sizes of about 0.5 microns consuming low energy. In this route, the major steps so far employed include dispersing the alumina oxide (Boehmite) in water to form alumina in sol state, addition of seeds like alpha alumina either by milling using alumina grinding media or direct addition of micronised alpha alumina particles. Then, selected additives such as magnesia, titania, yttria, etc., added; the material is dried, crushed and sintered using conventional sintering furnace. The conventional sintering furnace is typically an electric or oil or gas fired batch kiln with a rotary kiln. The heating rate is about 20° C./minute as the system applies external heating to the material.

As a rule of thumb, the performance of the abrasives with the same hardness, toughness and density improves with decrease in grain size. It is possible to achieve very small grain sizes with high hardness, toughness and density, using the combination of sol get and microwave processes thereby improving the abrasive characteristics when compared to the conventional process. This process requires lower temperature, around 1400° C.

By the use of the process of the present invention, it is possible to prepare a new variety of alumina abrasive grains at considerably lower energy with small crystal size, high hardness and density. The process of the present invention also involves use of a microwave sintering technique in which higher heating rates are employed to form finer particles than conventional products. In the process of the invention, microwave heat is generated internally within the material instead of originating from external heating sources and is a function of the material being process. It is seen that as the temperature increases above a certain point, the dielectric loss begins to increase rapidly and the material begins to absorb microwaves more efficiently. This also raises the temperature very rapidly. In many cases the heating rates are as high as 300° C./minute. Both batch and continuous processing systems can be employed.

The raw material used in the process of the present invention is boehmite dispersed in water with a concentration in the range of 15 to 30 weight percentage. The pH is adjusted between 2 to 4 by controlled addition of an acid such as nitric acid and peptized. The additives such as iron, silicon, titanium, magnesium, yttrium, neodymium, lanthanum etc., are added as their hydroxides, oxides or nitrates. The amount of additives may vary from 0.1 to 7 weight percentage when considered as their oxides. Seeding involves sub micron alpha alumina seeds in the amount of up to 1.5% by weight. Control drying chemical additives may be added in the range of 0.1 to 1.0% to ensure uniform heating of the mixture and to aid pore free drying. The gel prepared is dried at the temperatures of 600° to 800° C. The dried gel is crushed to the required size giving allowance for the shrinkage during sintering. The shape of the grains is modified to suit the end use by selection of a suitable crushing system.

The graded gel is then calcined in the temperature range of 300° to 900° C. for about 30 minutes to drive away the volatiles. The calcined grains are then sintered using microwave technology at temperatures less than 1500° C.

Another object of the present invention is to provide an improved process for the preparation of alumina abrasive grains having low crystal sizes, high hardness and toughness and density overcoming the drawbacks of the hitherto known processes.

Yet another object of the present invention is to produce an improved process for the preparation of alumina abrasive grains having Micro Vickers hardness above 2100 kg/sq. mm, 90% theoretical density with crystalline uniformity and average crystal size less than 0.6 microns.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
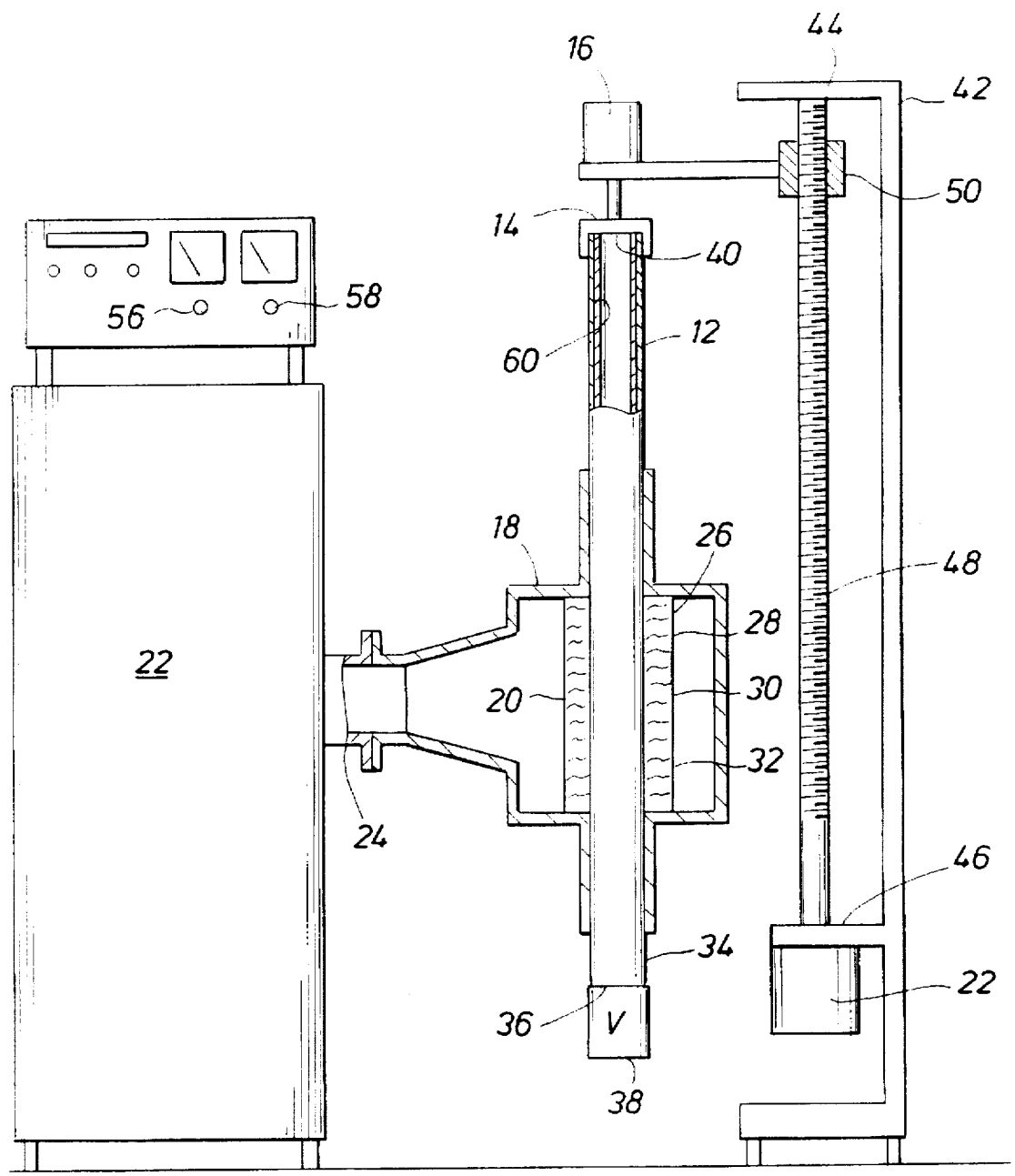
FIG. 1 is a schematic representation of a microwave system suitable for continuous sintering.

The microwave oven employed (equipped with a power control and a timer) produces microwave energy of 2.45 GHz frequency and power output of 900 W. The calcined grain is placed in the closed insulating chamber, called the microwave cavity. The insulating material is an aluminum silicate based material. An inner sleeve of porous zirconia is also included. The system reduces heat loss while maintaining high temperatures. A sheathed thermocouple is introduced for temperature measurement, and placed near the sample. As a precaution, the body of the oven is provided with watercooled tubes. This microwave oven procedure provides batch or continuous processing of alumina abrasive grains. For a continuous operation, the material is added to the top of a sintered alumina/or fused quartz tube in the microwave field. The material for sintering is continuously fed from top and sintered alumina grains are drained at the bottom of tube at a controlled rate.

The grit manufacturing process is set out in the examples given below which are provided by way of illustration only and should not be construed to limit the scope of this present invention.

EXAMPLE 1

400 g of boehmite was dispersed in 2.4 liters of hot water at 80° C., and the pH was brought down to 2.5. To this, 3.46 g of ferric oxide was added in the form of its hydroxide followed by addition of 0.62 g of titania as its hydroxide, and also 0.78 g of precipitated silica and 0.51 g of calcia. 2.0 g of polyethylene glycol was added. Seeding was done using 4.5 g of submicron alpha alumina seeds. This was followed by the addition of 30.8 g of magnesium nitrate as a solution and the dispersion was continued for an additional 20 minutes more. This was dried at 80° C. for 30 minutes. Calcined gel was then sintered in the microwave oven at a temperature of 1400° C. for 45 minutes.

The product showed an average crystal size of 0.5 microns, specific gravity of 3.91 g/cc, micro Vickers hardness of 2205 kg/sq. mm, with an abrasion index of 85.

EXAMPLE 2

400 g of boehmite was dispersed in 3 liters of water, and the pH was brought down to 2 followed by the addition of 1.5 g of titania. It was seeded using 3.0 g of submicronised alpha alumina seeds followed by the addition of 46.2 g of magnesium nitrate as a solution in water. After dispersing again for half an hour, the gel was dried at 70° C. for 30 hours. The dried gel was crushed, graded and calcined at 500° C. for an hour. These grains were then sintered in the microwave oven at a temperature of 1450° C. for 15 minutes. The product showed an average crystal size of 0.6 microns, specific gravity 3.84, micro Vickers hardness of 1863 kg/sq mm and abrasion index of 80.

EXAMPLE 3

400 g of boehmite was dispersed in 2 liters and pH brought down to 3. Both yttria and lanthanum oxide were taken in equal quantities of 2.25 g and dissolved in dilute nitric acid and added followed by 3 g of submicron sized alpha alumina seeds. The gel was then dried at 80° C., crushed and graded. The graded material was then calcined at 600° C. for 30 minutes followed by microwave sintering at 1450° C. for 30 minutes.

The abrasive grain had an average crystal size of 0.5, specific gravity 3.84, micro Vickers hardness of 1863.25 kg/sq. mm and an abrasion index of 95.

EXAMPLE 4

400 g of boehmite was dispersed in 2 liters of water at 80° C., the pH was brought down to 3 by the addition of nitric acid, while being dispersed, the additives 2.25 g of yttria, 2.25 g of lanthanum oxide and 2.25 g of neodymium oxide were added. 2 g of polyethylene glycol was added followed by alpha alumina seeds of 3 g. The gel was then dried at 70° C. This dried gel was crushed, graded and calcined at 600° C. for an hour. The calcined gel was then sintered at 1400° C. for 45 minutes.

The sintered grains where of average crystal size 0.4 microns, specific gravity 3.85 gm/cc, Micro Vickers Hardness 1897.3 kg/sq. mm and abrasion index of 95.

EXAMPLE 5

400 g of boehmite was dispersed in 1.8 liters of water and the pH was brought down to 2.5. To the above solution, we added 2.25 g of yttria, 2.25 g of lanthanum oxide, 2.25 g of neodymium oxide, 1.15 g of cobalt nitrate and 3 g of aluminum nitrate followed by 1.5 g of polyethylene glycol. The dispersion was continued and 4.5 g of alpha alumina seeds were added and the dispersion was stopped after another 20 minutes. This was then dried at a temperature of 80° C. for 20 hours and the dried gel was crushed, graded and calcined at 500° C. for 1 hour. This was then microwave sintered at 1450° C. for 30 minutes. These showed an average crystal size of 0.5 micron, specific gravity 3.94, Micro Vickers Hardness 2387.76 kg/sq. mm and abrasion index of 100.

EXAMPLE 6

400 g of boehmite was dispersed in 1.8 liters of water, the pH was brought down to 2.5 by adding nitric acid, 4.5 g of yttria, 2.25 g of lanthanum oxide and 1.15 g of cobalt nitrate; then we added 3 g of alpha alumina seeds and 1.5 g of polyethylene glycol. After dispersing for 20 minutes, it dried at 80° C. The gel so dried was crushed and graded. This was then calcined at 500° C. for an hour and microwave sintered at 1400° C. for 30 minutes.

The abrasive grains so produced showed an average crystal size of 0.4 microns, specific gravity 3.86 gms/cc, Micro Vickers Hardness 1863 and an abrasion index of 98.

For some of the abrasive grains prepared by the process of the invention, the specific gravity and micro hardness values are provided below in the examples listed.

| Example | MW Sintering Temp °C. | Residence Time Minutes | Specific gravity | Hardness VH |
|---|---|---|---|---|
| V (1) | 1350 | 30 | 3.72 | 1880.25 |
| V (2) | 1350 | 60 | 3.88 | 1880.25 |
| V (3) | 1400 | 15 | 3.82 | 1897.31 |
| V (4) | 1400 | 30 | 3.85 | 1863.43 |
| V (5) | 1400 | 45 | 3.85 | 1880.25 |
| V (6) | 1450 | 15 | 3.88 | 2316.66 |
| V (7) | 1450 | 30 | 3.94 | 2387.76 |
| V (8) | 1500 | 5 | 3.70 | 1036.52 |
| V (9) | 1500 | 15 | 3.96 | 2316.66 |

Abrasion Index

This is a measure of abrasiveness. It is determined by using pin on disc system, a system which includes a rotating disc with a channel to hold the grains to be tested. An aluminum cylinder of 20 mm diameter and 25 mm length is fastened to a free rotating holder. A constant load of 10.5 N is applied on the sample. The disc is rotated at a fixed speed of 60 RPM. A slurry containing 30 weight percent abrasive grains of grit 36 is placed in water/glycerine medium. The loss in weight of the sample is noted for an hour at intervals of 15 minutes.

| Example | Abrasion Index |
|---|---|
| V (1) | 63 |
| V (2) | 66 |
| V (5) | 95 |
| V (7) | 100 |
| V (10) | 94 |

Microwave Sintering Operation

The feed material is a gel solution derived from alumina grit with average particle size of about 0.6 to about 1 mm. The dried grit is packed into a high purity alumina tube (30 mm in diameter and 900 mm in length) 12 which is held by a metal clamp 14 connected to the shaft of the rotating motor 16. The tube 12 is inserted into the microwave applicator 18 with a middle portion located in the central area 20 of the cavity. At the beginning, the tube is stationary in the original position and is held while rotating only, without vertical feeding movement. Microwave power is introduced to the applicator 18 and controlled to achieve the desired high heating rate (50° to 300° C./min). When the sample temperature reaches the set temperature, the feeding motor 22 is started to feed the tube at the desired speed (about 2 mm per minute). The temperature of the sample is monitored by an IR pyrometer (Accufiber Inc.), and is controlled by adjusting the incident microwave power. Sintering temperature and time can be varied from 1350° to 1500° C. and 45 to 5 minutes respectively. Parallel experiments from conventional furnace are reported to compare the results of the two processes.

Going over the apparatus in FIG. 1 in some detail, the microwave system 10 incorporates a microwave generator 22 which forms the microwave radiation at some extremely high frequency which is conveyed by a wave guide 24 to the microwave cavity. The cavity is defined on the interior of an insulative sleeve 26. The sleeve 26 prevents heat loss through the tube 12 as will be explained. The microwave cavity incorporates the central area 20 previously mentioned. In the central area, the material is heated in a first zone 28 and reaches the maximum or sintering temperature in an intermediate zone 30. Zone 30 is continuous with the zone 28. As the product moves downward, it enters into the zone 32 where cooling begins. There is a discharge zone 34 at the lower end. The sintered material is delivered through the lower end 36. For the sake of controlling the flow rate, a valve 38 is affixed at the lower end to meter the delivered product. At the upper end, the tube is hollow at the top end and the raw ingredients are introduced through the upper end 40. The collar or clamp 14 fastens on the exterior and preferably leaves the top end open for material to be added. The clamp 14 holds the tube 12 for rotation when driven by the motor 16 as mentioned.

An adjacent upstanding frame 42 supports a protruding bracket 44 aligned with a bottom bracket 46. The brackets 44 and 46 hold a rotating screw 48 which serves as a feed screw. A movable carriage 50 travels up and down as driven by the screw. The screw 48 is rotated by the feed motor 22 shown at the lower end of the equipment. Rotation in one direction or the other causes the carriage 50 to move up or down as the case may be.

The microwave system is provided with an adjustable power control 56 and a timer 58. The timer is used in batch fabrication which is normally simply switched on for continuous sintering. Attention is momentarily diverted to one aspect of the tube 12.

It preferably is a dual tube construction with a tube 60 fitting snugly inside the outer tube 12. This defines an internal cavity through which the porous particulate alumina is added at the top 40. It travels along the tube at a rate determined by the rate at which the valve 38 is operated so that the material is maintained in the hottest zone 30 for a controlled interval. For instance, the rate of flow down through the tube can be increased or decreased by throttling the flow through the valve 38. This assures that the material remains in the hottest portion of the microwave cavity 30. By rotating the tube continuously and continuing a feed through the tube 12 which causes gradual, relatively downward linear motion, the particles are processed as appropriate for microwave sintering in a batch. By rotating without feeding the tube 12 through the cavity 20, but with controlled particulate flow through the tube 12 and valve 38, continuous operating is provided. Otherwise, a single batch can be put in the tube and the tube advanced by the feed mechanism to heat one batch.

The morphology and microstructure of the samples were characterized by SEM, the densities of the sintered samples were measured by the Archimedes method, and the Vickers hardness was measured by Micro Indentation Method.

Figure 2A:
FIG. 2 shows alumina grit in microphotograph.
Figure 2B:
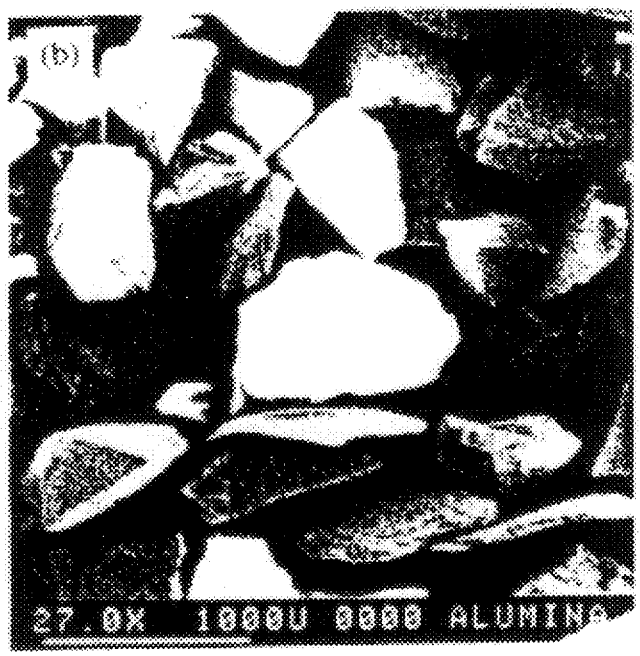
Figures 3A, 3B, 3C:
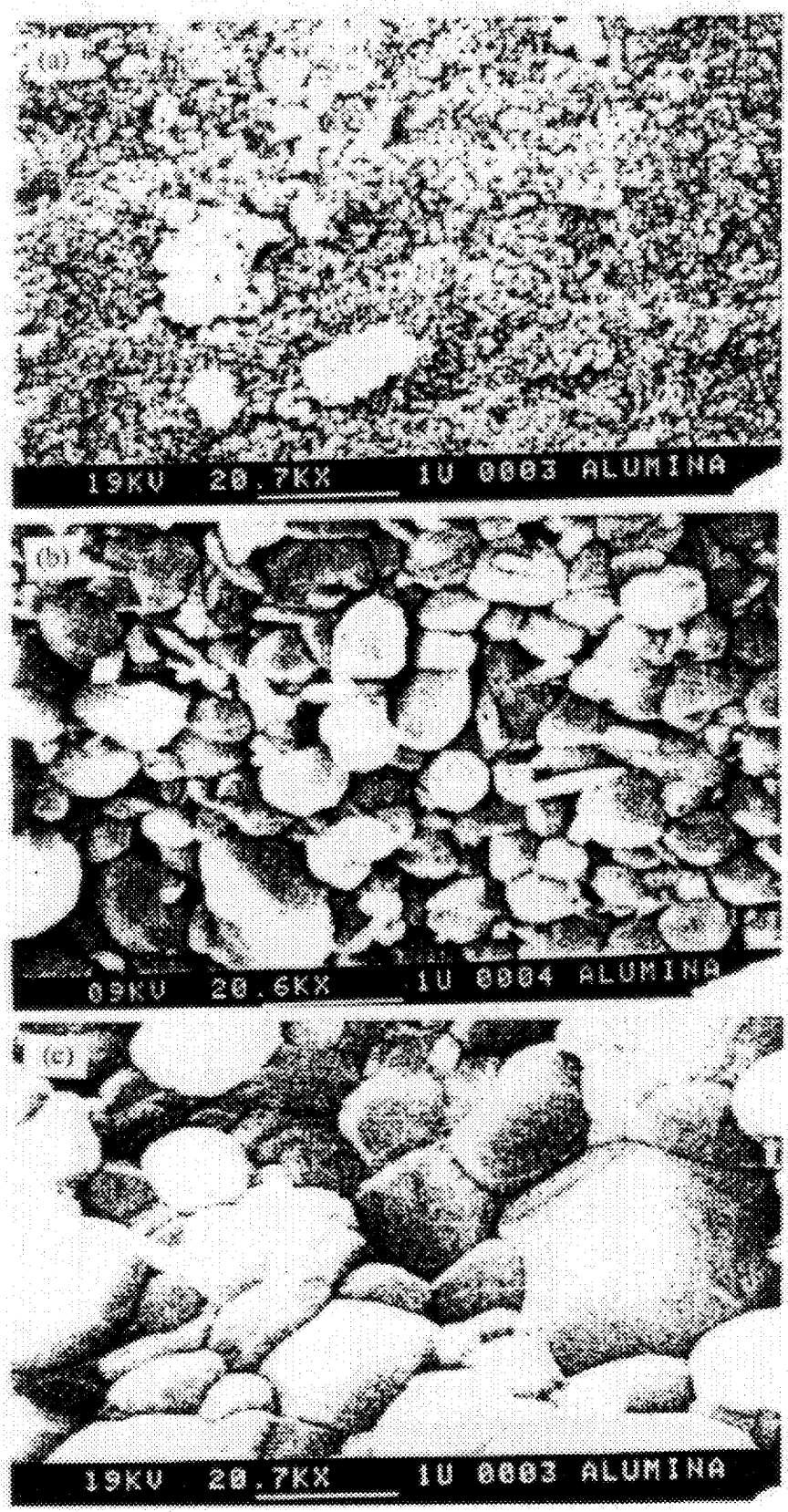
FIGS. 3 and 4 are microphotographs of alumina grit.
Figure 4A:
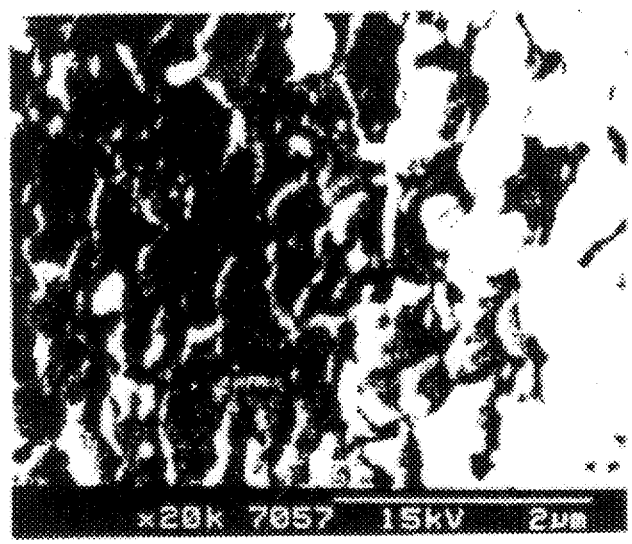
Figure 4B:

The grit morphology of the starting and sintered grit samples is shown in the attached microphotographs of FIGS. 2, 3 and 4. The shape of the grit did not change, but the average particle size of the sintered sample decreased about one third because of the shrinkage of grit during the sintering. It was expected that the grit particles would bind together tightly after the sintering. However, the results showed that there was no or very weak bonding between the particles. The sintered grit remains separated. This is important as it makes it possible to feed the grit into the alumina tube continuously with the automatic feeder during the microwave sintering. Thus, processing of large amounts for commercial production can be achieved.

The quality of the microwave sintered alumina abrasive grit mainly depends on the sintering temperature and time. During the continuous microwave sintering process, the temperature is controlled by microwave power, and the sintering time (actually, this is the residence time of the grit samples in the high temperature zone) depends on the height of the high temperature zone and the feeding speed. Theoretically, higher feeding speed will lead to a higher product output, but has to be optimized for each material to accomplish high quality products. The uniform high temperature zone is about 30 mm long in the microwave applicator. In this case, the residence time of the sample in the high temperature zone was about 15 minutes at a feeding speed of 2 mm/minute.

A large batch of commercial alumina abrasive grit was processed by a newly developed continuous microwave sintering technique. The quality of the microwave sintered products depends on the sintering temperature and sintering time. During the continuous microwave sintering processing, the sintering time can be controlled by the feeding speed of the green particles. As seen from the results the microwave sintered product gives much high abrasive index and hardness values with uniformly controlled micro structure.

As used in the claims which follow, the term "aluminum oxide" includes a variety of aluminum oxide forms. While boehmite is named, it also includes anhydrous forms also.

While the foregoing is directed to the preferred embodiment, the scope thereof is determined by the claims which follow.

We claim:

1. An improved process for the preparation of alumina abrasive grains which comprises the steps of:
    (a) dispersing aluminum oxide in water at a temperature in the range of 40° to 80° C.;
    (b) adjusting the pH of the dispersed solution to an acidic range of about 4 or less;
    (c) seeding the solution by adding submicronized alpha-alumina particles to assist in precipitation;
    (d) crushing the recovered precipitate;
    (e) calcining the crushed precipitate at a temperature in the range of about 300° to 900° C. for a period in the range of about 30 to 120 minutes; and
    (f) sintering the calcined precipitate by microwave at a temperature between about 1200° and 1500° C. for a period of about 5 to 60 minutes.

2. An improved process as claimed in claim 1 wherein the pH is maintained between about 2 to 4 by adding an acid to the water.

3. An improved process as claimed in claim 2 wherein additives selected from the group consisting of oxides, nitrates, or hydroxides are added to the acidified water.

4. The product made by the method of claim 1.

5. The method of claim 3 wherein the additives are added in an amount up to about 7 wt %.

6. The method of claim 1 wherein the amount of seed is added in an amount up to about 2 wt %.

7. The method of claim 1 wherein the calcination is carried out at about 600° C. for at least about 30 minutes.

8. A method of making alumina abrasives which comprises:
    (a) dispersing boehmite in water at a temperature in the range of 30° to 80° C.;
    (b) adjusting the pH of the water to the range of 2 to 4;
    (c) mixing additives in the water;
    (d) seeding the water with sub-micronized alpha alumina particles;
    (e) drying to remove water at a temperature in the range of 40° to 80° C.;
    (f) crushing the dried material to a selected size and shape;
    (g) calcining the crushed material in temperature range of 300° to 900° C. for a period ranging up to about 120 minutes;
    (h) sintering the calcined material by microwave at temperature below 1500° C. for a period up to about 60 minutes.

9. The method of claim 8 wherein the microwave radiation is about 2.45 GHz frequency.

10. The method of claim 8 wherein the microwave energy is the sole heat source for sintering.

11. The method of claim 8 wherein the step of sintering the calcined material includes the preliminary step of pouring the material into a closed chamber in loose particulate form.

12. The method of claim 8 wherein the step of sintering the calcined material includes the preliminary step of placing the crushed material in a microwave transparent container prior to sintering, and then sintering by directing microwave energy through the container into the crushed calcined material.

* * * * *

UNITED STATES PATENT AND TRADEMARK OFFICE
CERTIFICATE OF CORRECTION

PATENT NO. : 5,782,940  
DATED : July 21, 1998  
INVENTOR(S) : Jayan et al.

Page 1 of 1

It is certified that error appears in the above-identified patent and that said Letters Patent is hereby corrected as shown below:

Column 1,
Line 48, please add -- , -- after "kg/mm$^2$".

Column 2,
Line 24, delete "get" and replace with -- gel --.

Column 4,
Line 17, after "liters", please add -- of water -- and after "pH", please add -- was --;
Line 25, after "0.5" please add -- micron --;
Line 63, after "acid", please add -- ;also, --;
Line 64, after "nitrate" please add -- were added and --.

Signed and Sealed this

Twenty-third Day of July, 2002

Attest:

Attesting Officer

JAMES E. ROGAN
*Director of the United States Patent and Trademark Office*